Figure 1:
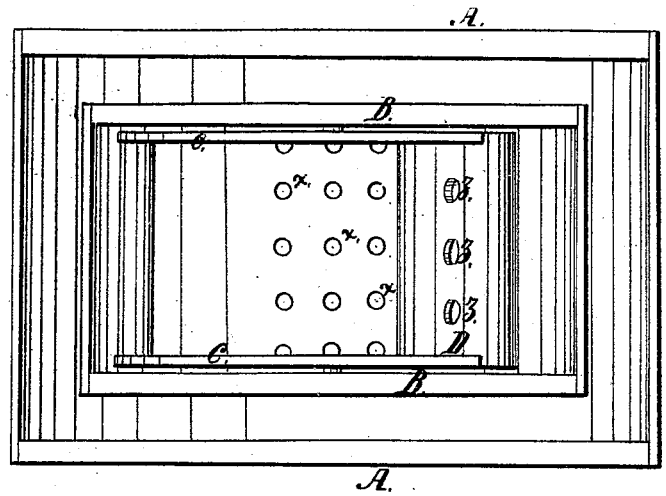
Figure 2:
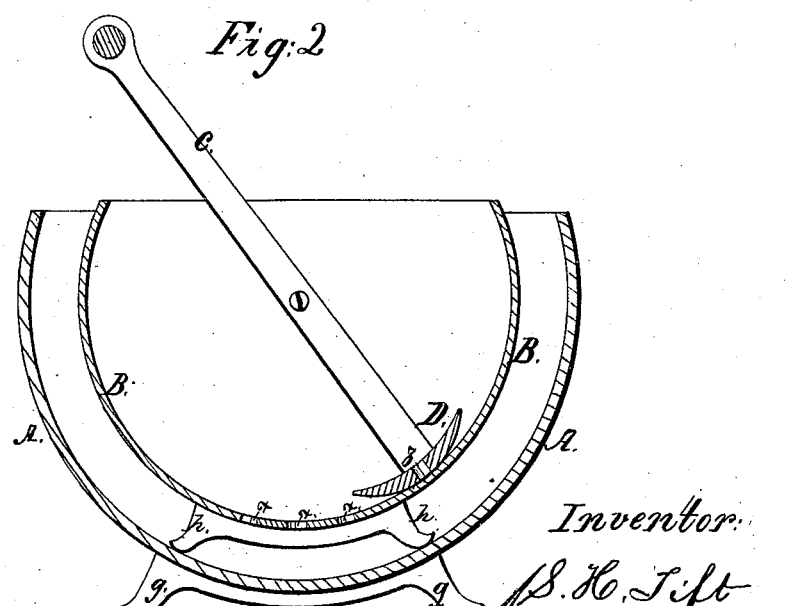

S. H. Tift,
Potato Washer,

Nº 77,679. Patented May 5, 1868.

Witnesses:
Wm Wanzleben
V. D. Stockbridge

Inventor:
S. H. Tift
per Alexander Hudson
attys

United States Patent Office.

S. H. TIFT, OF MORRISVILLE, VERMONT.

Letters Patent No. 77,679, dated May 5, 1868.

IMPROVED POTATO-WASHER.

*The Schedule referred to in these Letters Patent and making part of the same.*

TO ALL WHOM IT MAY CONCERN:

Be it known that I, S. H. TIFT, of Morrisville, in the county of Lamoille, and in the State of Vermont, have invented certain new and useful Improvements in Potato-Washers; and do hereby declare that the following is a full, clear, and exact description thereof, reference being had to the accompanying drawings, and the letters of reference marked thereon.

In the annexed drawings, making a part of this specification, A represents a tub or vessel, made of any suitable material, and in the form shown in the drawings, the inside of the bottom made concave, and circular in form, and the whole supported upon suitable legs $g\ g$.

B represents another vessel, made similar in shape with the vessel A, and somewhat smaller, so as to be set inside of said vessel A when desired. The vessel B is also provided with legs $h\ h$, and has a series of holes or perforations, $x\ x$, through the bottom of it.

To the inside of the sides of the vessel B, I pivot arms or levers C C, connected together at the top by a suitable cross-bar or rod, and having secured to the bottom a concavo-convex slat, D, which operates as an agitator to stir and mix up the potatoes in the vessel, and water, and thereby cleanse them. The arms C C are pivoted, so that their lower ends, with the agitator D thereon, just reach to the bottom of the vessel B, and describe a circle, or the part of one, to correspond with the curved bottom of said vessel. The agitator D has perforations $z\ z$ through it, so as to allow free and full circulation or passage for the water.

To use my device, I first fill, or partially fill, the vessel B with potatoes, then set the same inside of the vessel A, and pour a suitable amount of water over the potatoes and into said vessels. The operator then moves the arms C C backward and forward, and thereby the agitator D, a few times, and the potatoes are thoroughly washed. The vessel B is then raised up, and the water allowed to run out, when the potatoes may be taken to any place desired.

Having thus fully described my invention, what I claim as new, and desire to secure by Letters Patent, is—

The arrangement of the vessel B, provided with perforations $x\ x$ and legs $h\ h$, with the arms C C, agitator D, and outside vessel A, the several parts being constructed and operated substantially as and for the purpose specified.

In testimony that I claim the foregoing, I have hereunto set my hand, this 18th day of March, 1868.

S. H. TIFT.

Witnesses:
C. M. ALEXANDER,
J. M. MASON.